US008275079B2

(12) United States Patent
Hung et al.

(10) Patent No.: US 8,275,079 B2
(45) Date of Patent: Sep. 25, 2012

(54) COMMUNICATION APPARATUS, METHOD, AND TANGIBLE MACHINE-READABLE MEDIUM THEREOF FOR PROCESSING RANGING INTERFERENCE OF AN ORTHOGONAL FREQUENCY DIVISION MULTIPLEXING SIGNAL

(75) Inventors: Kun-Chien Hung, Hsiang-Yuan Village (TW); David W. Lin, Hsinchu (TW); Youn-Tai Lee, Yung-Ho (TW); Yi-Ting Lin, Yonghe (TW)

(73) Assignee: Institute for Information Industry, Taipei (TW)

( * ) Notice: Subject to any disclaimer, the term of this patent is extended or adjusted under 35 U.S.C. 154(b) by 1014 days.

(21) Appl. No.: 12/165,080

(22) Filed: Jun. 30, 2008

(65) Prior Publication Data
US 2009/0238291 A1   Sep. 24, 2009

(30) Foreign Application Priority Data
Mar. 19, 2008   (TW) ............................... 97109743 A

(51) Int. Cl.
*H04B 1/10*   (2006.01)

(52) U.S. Cl. .......... 375/346; 375/260; 375/285
(58) Field of Classification Search .............. 375/354, 375/360, 367, 316–352
See application file for complete search history.

(56) References Cited

U.S. PATENT DOCUMENTS

| 7,778,153 B2 * | 8/2010 | Choi et al. .......... 370/210 |
| 2008/0305804 A1 * | 12/2008 | Lee et al. ............ 455/446 |

* cited by examiner

*Primary Examiner* — Sam K Ahn
*Assistant Examiner* — Janice Tieu
(74) *Attorney, Agent, or Firm* — Patterson Thuente Christensen Pedersen, P.A.

(57) ABSTRACT

A communication apparatus, a method, and a tangible machine-readable medium thereof for processing ranging interference of an orthogonal frequency division multiplexing (OFDM) signal. The communication apparatus comprises a receiving unit, a processing unit, and a mask generating unit. The receiving unit receives the OFDM signal having a plurality of OFDM symbols. The processing unit estimates a delay value and an energy value of at least one ranging code according to the OFDM symbols. The mask generating unit generates a mask function according to the delay value and the energy value. Finally, the processing unit synthesizes the ranging interference in the OFDM signal and removes it according to the mask function.

18 Claims, 5 Drawing Sheets

COMMUNICATION APPARATUS, METHOD, AND TANGIBLE MACHINE-READABLE MEDIUM THEREOF FOR PROCESSING RANGING INTERFERENCE OF AN ORTHOGONAL FREQUENCY DIVISION MULTIPLEXING SIGNAL

This application claims the benefit of priority based on Taiwan Patent Application No. 097109743, filed on Mar. 19, 2008, the contents of which are incorporated herein by reference in their entirety.

CROSS-REFERENCES TO RELATED APPLICATIONS

Not applicable.

BACKGROUND OF THE INVENTION

1. Field of the Invention

The present invention relates to a communication apparatus, a method, and a tangible machine-readable medium thereof. More particularly, the present invention relates to a communication apparatus, a method, and a tangible machine readable medium thereof for processing the ranging interference of an orthogonal frequency division multiplexing (OFDM) signal.

2. Descriptions of the Related Art

Orthogonal frequency division multiplexing (OFDM), especially a variant known as orthogonal frequency division multiplexing access (OFDMA), is a wireless transmission scheme that combines time division multiplexing (TDM) and frequency division multiplexing (FDM). This technology employs different subcarriers to provide data transmission for different users or to transmit data for different purposes.

The IEEE 802.16 (also referred to as Worldwide Interoperability for Microwave Access, abbreviated WiMAX) standards specify wireless transmission employing the OFDMA transmission scheme. In the uplink transmission, ranging symbols may be transmitted simultaneously with data from subscriber stations (SSs) to attain and maintain subcarrier synchronization and symbol timing synchronization between the base station (BS) and each subscriber station to avoid interference among the data transmissions of multiple SSs.

When a new-coming SS desires to perform network entry to a BS, the SS will firstly transmit an initial ranging symbol to the BS for initial network entry. However, because the SS has not entered into the network of the BS yet, it does not know the distance from the BS. Consequently, the initial ranging symbol will experience unspecific round-trip transmission delay (RTD). Such a delay will cause the BS to receive an incompletely overlapped ranging symbol in some OFDM/OFDMA symbol periods, and in turn cause interference to data from other SSs due to such incomplete ranging symbols. Such interference that arises from the RTD characteristics of initial ranging symbols of newly coming SSs is called "ranging interference". FIG. 1 is a schematic diagram illustrating how initial ranging symbols interfere with SS data. Here, the SS data 11 comprises three OFDM symbols 111, 113, 115, with respective cyclic prefixes (CPs) 110, 112, 114; while the initial ranging signal (interchangeably termed ranging code in this invention) 13 comprises two ranging symbols 131, 133. As can be seen in FIG. 1, the OFDM symbols 111 and 115 of the SS data 11 are respectively superimposed with incomplete ranging symbols 135 and 137 of the ranging signal 13, which become sources of interference to the SS data 11.

To prevent ranging interference, a conventional practice is to use a CP with a length larger than the BS coverage area as a guard interval. However, an overlong CP may degrade the bandwidth efficiency. For example, the transmission bandwidth of a WiMAX OFDMA under the 1024-point Fast Fourier Transform (FFT) specifications is 10 MHz. A CP with a length of ⅛ of a symbol may guard up to about 1.75 kilometers (km) of RTD of ranging signals, while a CP with a length of ¼ of a symbol may guard up to 3.5 km of BS coverage area. However, the ⅛-symbol CP is 16.7% better in bandwidth efficiency than the ¼-symbol CP. Further, if a BS coverage area of 10 km in radius is considered, a CP of at least 70% of one OFDM symbol in length will be needed, which will cause a significant degradation of the bandwidth efficiency and is incompatible with the practice in wireless communication systems.

To obviate the degradation in bandwidth efficiency due to long CP, other methods can be employed to mitigate the ranging interference from initial ranging symbols to SS data. One approach is to avoid the ranging interference, while another is to eliminate the ranging interference. Concerning avoidance of ranging interference, a more robust coding and modulation scheme that is less susceptible to interference may be used in the presence of initial ranging symbols, e.g., using 4-QAM modulation or QPSK modulation with rate-1/2 coding to resist the possible ranging interference from initial ranging symbols. Alternatively, all ranging symbols may be concentrated within some transmission slots and separated from the data transmission slots to prevent possible interference from the ranging symbols to the SS data. On the other hand, concerning elimination of ranging interference, a technique that may be termed coherent interference estimation can be used to remove the ranging interference. However, the coherent interference estimation needs to calculate the channel response for each ranging symbol and generate a corresponding ranging interference to remove or correct the ranging interference of each ranging symbol and thereby estimate the data transmitted by the SSs. Although the aforesaid techniques may mitigate the degradation in bandwidth efficiency caused by long CP, they also come with other shortcomings.

In summary, although the solutions to ranging interference described above can all decrease the interference from initial ranging symbols to SS data, they all have their shortcomings. For example, use of a long CP may decrease the overall bandwidth efficiency, using a more robust coding and modulation scheme that is less susceptible to interference may lower the data transmission rate, and use of coherent interference estimation to remove the ranging interference may lead to intensive computations.

Therefore, efforts still have to be made by the wireless communication network operators and the wireless communication apparatus manufacturers to avoid or eliminate ranging interference from the initial ranging symbols without compromising the overall bandwidth efficiency, data transmission rate and data computation complexity.

SUMMARY OF THE INVENTION

One objective of this invention is to provide a method for removing ranging interference in an orthogonal frequency division multiplexing (OFDM) signal. The OFDM signal comprises a plurality of OFDM symbols. The method comprises the following steps of receiving the OFDM signal; estimating a time delay and an energy value of at least one ranging code based on the OFDM symbols; generating a mask function according to the time delay and the energy value of the at least one ranging code; and synthesizing and removing the ranging interference in the OFDM signal according to the mask function.

Another objective of this invention is to provide a communication apparatus for processing an OFDM signal. The OFDM signal comprises a plurality of OFDM symbols. The communication apparatus comprises a receiving unit, a processing unit and a mask generating unit. The receiving unit is configured to receive the OFDM signal. The processing unit is configured to estimate a time delay and an energy value of at least one ranging code based on the OFDM symbols. The mask generating unit is configured to generate a mask function according to the time delay and the energy value of the at least one ranging code. Finally, the processing unit synthesizes and removes ranging interference in the OFDM signal according to the mask function.

Yet a further objective of this invention is to provide a tangible machine-readable medium having executable code to cause a communication apparatus to perform a method for removing ranging interference of an OFDM signal. The OFDM signal comprises a plurality of OFDM symbols. The method comprises the following steps of receiving the OFDM signal; estimating a time delay and an energy value of at least one ranging code based on the OFDM symbols; generating a mask function according to the time delay and the energy value of the at least one ranging code; and synthesizing and removing the ranging interference in the OFDM signal according to the mask function.

Thus, this invention estimates the time delays and the energy values of ranging codes based on the OFDM symbols from the SSs in an uplink transmission, and then generates a mask function according to the time delays and the energy values of the ranging codes. Finally, possible interference caused by the ranging codes is synthesized according to the mask function and filtered from the OFDM signal to avoid making errors in other data from the SSs due to the ranging interference. As a result, when processing an OFDM signal, a communication apparatus may avoid or remove the ranging interference caused by the initial ranging symbols with less computation and maintain the overall bandwidth efficiency and data transmission rate of the wireless communication system.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 1:
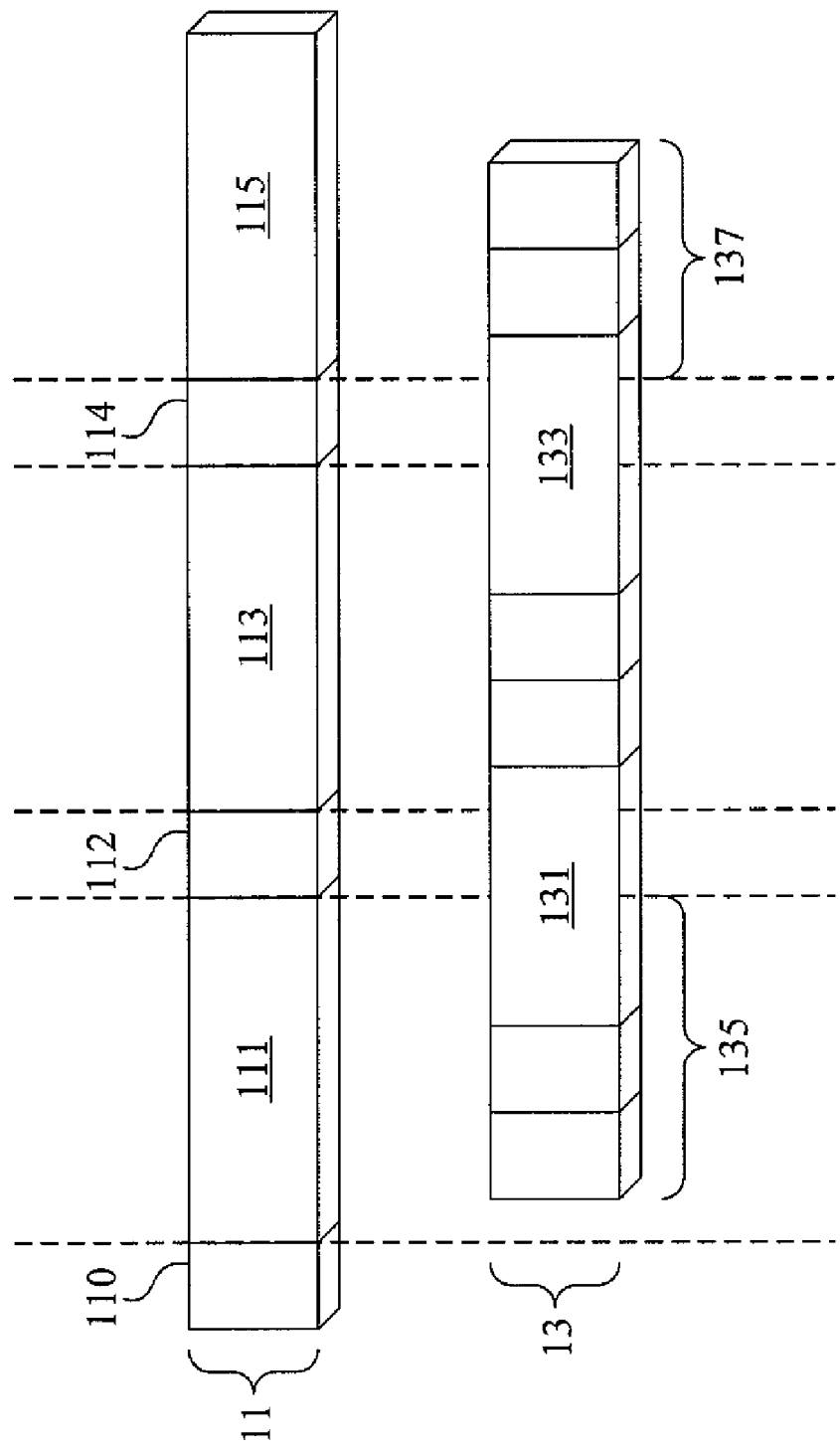
FIG. 1 is a schematic diagram illustrating the initial ranging symbols and subscriber station data.
Figure 2:
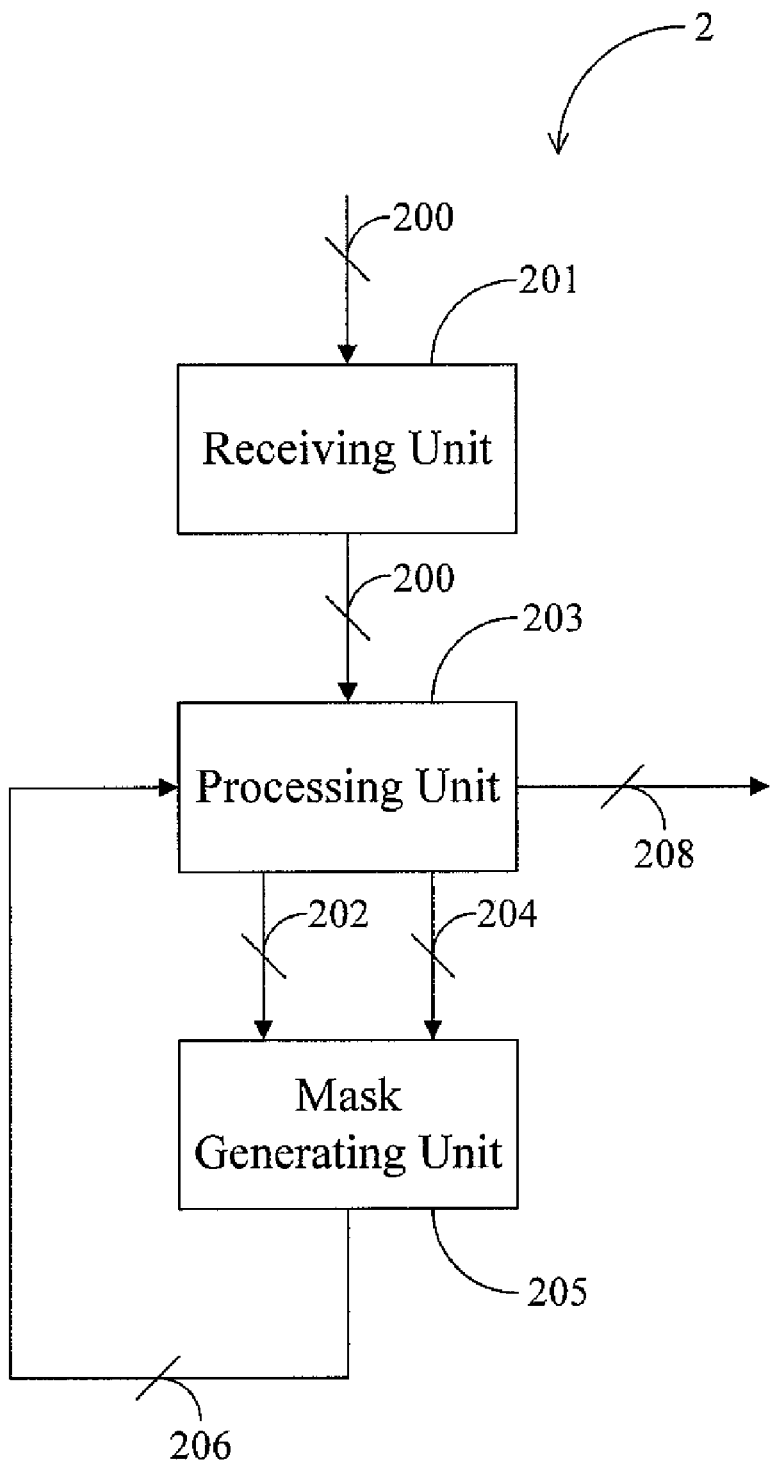
FIG. 2 is a schematic diagram illustrating the first embodiment of this invention.

FIG. 2 illustrates the first embodiment of this invention, which is a communication apparatus 2 comprising a receiving unit 201, a processing unit 203 and a mask generating unit 205. The communication apparatus 2 may be a wireless communication apparatus for use in an OFDMA wireless communication system, for example, a base station that conforms to IEEE 802.16 standards. The receiving unit 201 is configured to receive an OFDM signal 200. The processing unit 203 is configured to estimate a time delay set 202 and an energy value set 204 of one or more ranging codes according to the OFDM symbols of the OFDM signal 200. The mask generating unit 205 is configured to generate a mask function 206 according to the time delay set 202 and the energy value set 204 estimated for the ranging codes. Finally, the processing unit 203 synthesizes a ranging interference signal according to the mask function 206 and removes the ranging interference from the OFDM signal 200 to generate an interference-removed signal 208.

Figure 3:
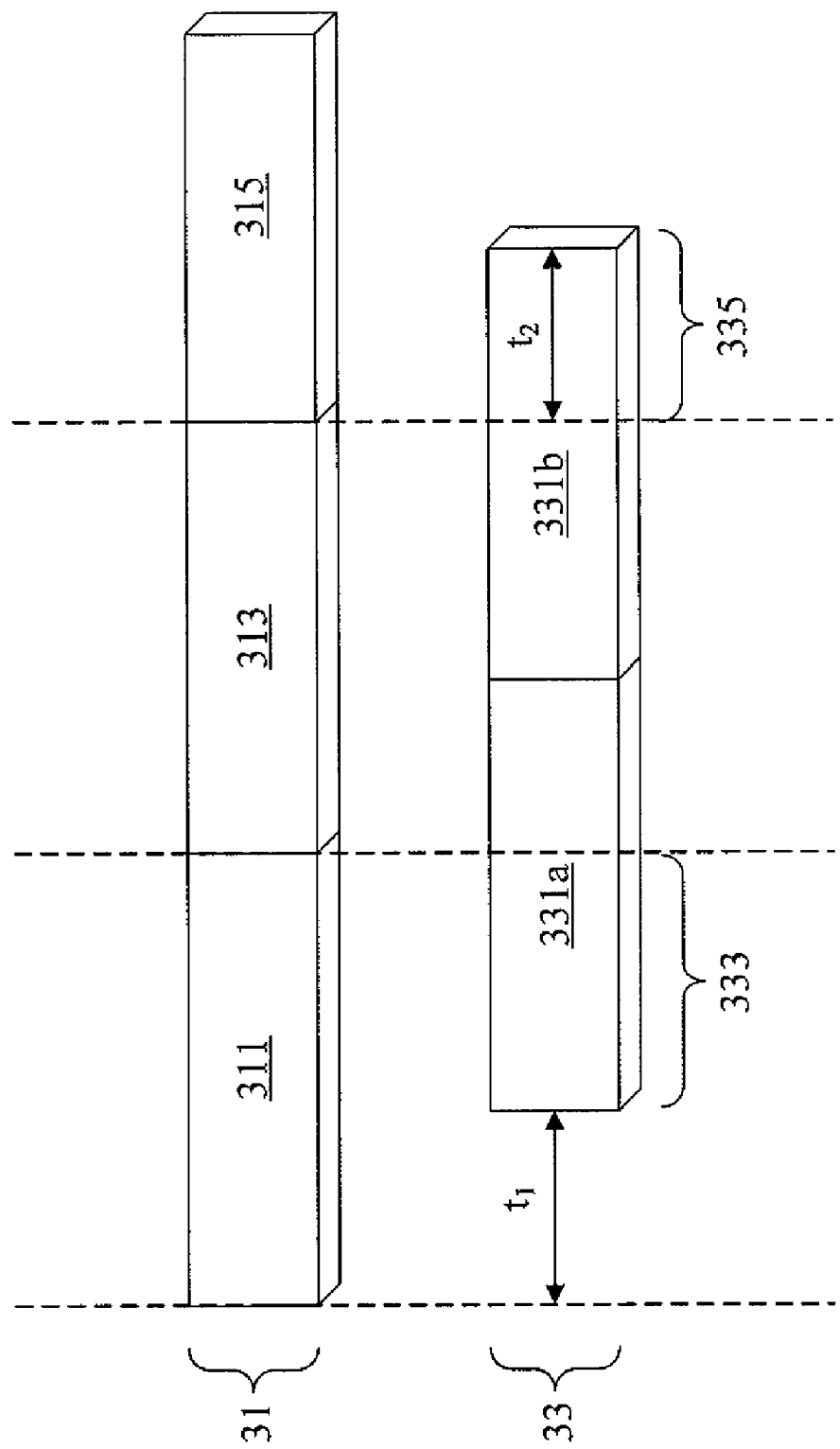
FIG. 3 is a schematic diagram illustrating an OFDM signal comprising the ranging code of a single entering subscriber station.

More specifically, when the OFDM signal 200 contains the ranging code of only a single entering subscriber station propagated through a channel of only one dominant path, the OFDM signal 200 is illustrated in FIG. 3. The SS data 31 comprises three OFDM symbols 311, 313, 315, while the ranging code 33 comprises two ranging symbols 331a, 331b. Portions 333, 335 of the ranging code 33 that are superimposed with the OFDM symbols 311, 315 of the SS data 31 act as sources of interference to the SS data 31. In this case, the mask generating unit 205 will derive two mask functions corresponding to superimposed portions 333, 335 respectively, to remove the interference caused by the superimposed portions 333, 335.

The mask function for removing the superimposed portion 333 is determined according to the following equation:

$$w(n)=CU(n-t_1)$$

wherein $w(n)$ represents the mask function, $U(n-t_1)$ represents a step function for the ranging code of the entering subscriber in the superimposed portion 333, C represents a weight (not shown in the figure) of the step function, n represents a time index, and $t_1$ represents the time delay parameter of the ranging code of the entering subscriber in the superimposed portion 333, and is obtained from an estimated time delay value of the ranging code of the entering subscriber.

The weight C of the step function for the ranging code of the entering subscriber in the superimposed portion 333 is determined according to the following equation:

$$C = \frac{S}{S+\sigma_\eta^2}$$

wherein S represents an estimated energy value (not shown in the figure) of the received ranging code of the entering subscriber and $\sigma_\eta$ represents a variance of Gaussian noise.

The mask function for removing the superimposed portion 335 is determined according to the following equation:

$$w(n)=CU(t_2-n)$$

wherein $w(n)$ represents the mask function, $U(t_2-n)$ represents the step function for the ranging code of the entering subscriber in the superimposed portion 335, C represents the weight (not shown in the figure) of the step function, which is the same as that of the step function for the superimposed portion 333 and thus will not be described, n represents the time index, and $t_2$ represents the time delay parameter of the ranging code of the entering subscriber in the superimposed portion 335, and is obtained from an estimated time delay value of the ranging code of the entering subscriber.

Figure 4:
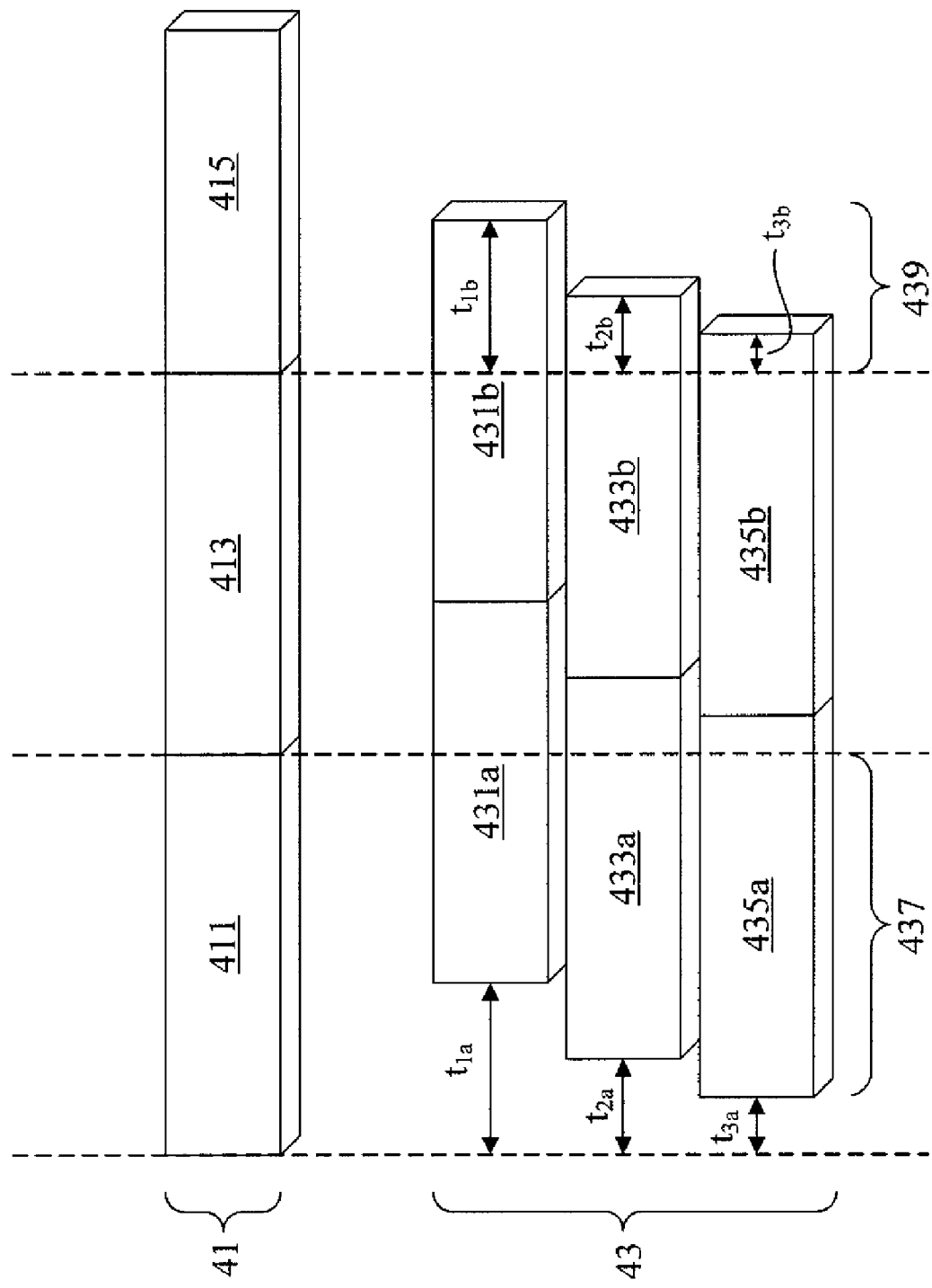
FIG. 4 is a schematic diagram illustrating an OFDM signal comprising the ranging codes of a plurality of entering subscriber stations.

On the other hand, when the OFDM signal 200 contains the ranging codes of a plurality of entering subscriber stations with each propagated through a channel of only one dominant path, e.g., the ranging codes of three entering subscriber stations, the OFDM signal 200 is illustrated in FIG. 4. The SS data 41 comprises three OFDM symbols 411, 413, 415, while the ranging code set 43 comprises six ranging symbols 431*a*, 431*b*, 433*a*, 433*b*, 435*a*, 435*b*. The ranging symbols 431*a*, 431*b* are the ranging code of a first entering SS, the ranging symbols 433*a*, 433*b* are that of a second entering SS, and the ranging symbols 433*a*, 433*b* are that of a third entering SS. Portions 437, 439 of the ranging code set 43 superimposed with the OFDM symbols 411, 415 of the SS data 41 act as sources of interference to the SS data 41. In this case, the mask generating unit 205 will derive two mask functions corresponding to the superimposed portions 437, 439 respectively, to remove the interference caused by the superimposed portions 437, 439.

The mask function for removing the superimposed portion 437 is determined according to the following equation:

$$w(n) = \sum_{i=1}^{M} C_i U(n - t_i)$$

wherein w(n) represents the mask function, M, which is greater than or equal to one, represents a number of the entering subscribers (three in FIG. 4), U(n–$t_i$) represents a step function for the ranging code of each entering subscriber in the superimposed portion 437, $C_i$ represents the weight (not shown in the figure) of each step function, n represents the time index, and $t_i$ represents the time delay parameter of the ranging code of each entering subscriber in the superimposed portion 437 (i.e., $t_{1a}$, $t_{2a}$ and $t_{3a}$), and is obtained from an estimated time delay value of the ranging code of each entering subscriber.

The weight $C_i$ of the step function for the ranging code of each entering subscriber in the superimposed portion 437 is determined according to the following equation:

$$C_i = \frac{S_i}{\sum_{i=1}^{M} S_i + \sigma_\eta^2}$$

wherein $S_i$ represents an estimated energy value (not shown in the figure) of the received ranging code of each entering subscriber and $\sigma_\eta$ represents a variance of Gaussian noise.

The mask function for removing the superimposed portion 439 is determined according to the following equation:

$$w(n) = \sum_{i=1}^{M} C_i U(t_i - n)$$

wherein w(n) represents the mask function, M, which is greater than or equal to one, represents the number of the entering subscribers (three in FIG. 4), U($t_i$–n) represents the step function for the ranging code of each entering subscriber in the superimposed portion 439, $C_i$ represents the weight (not shown in the figure) of each step function, which is the same as that of the corresponding step function in the superimposed portion 437 and thus will not be described, n represents the time index, and $t_i$ represents the time delay parameter of the ranging code of each entering subscriber in the superimposed portion 439 (i.e., $t_{1b}$, $t_{2b}$ and $t_{3b}$), and is obtained from an estimated time delay value of the ranging code of each entering subscriber.

In case any of the ranging codes 431*a* and 431*b*, 433*a* and 433*b*, and 435*a* and 435*b* of the entering subscribers is received by the receiving unit 201 through a plurality of channel paths (i.e., multi-paths), the mask function for removing the superimposed portion 437 is determined according to the following equation:

$$w(n) = \sum_{i=1}^{M} \sum_{l=1}^{L} C_{il} U(n - t_{il})$$

wherein w(n) represents the mask function, M, which is greater than or equal to one, represents the number of entering subscribers (three in FIG. 4), L, which is greater than or equal to one, represents the number of paths for the ranging code of each entering subscriber, U(n–$t_{il}$) represents the step function for each path of the ranging code of each entering subscriber in the superimposed portion 437, $C_{il}$ represents the weight of each of the step functions (not shown in the figure), n represents the time index, and $t_{il}$ represents the time delay parameter of each path of the ranging code of each entering subscriber in the superimposed portion 437, and is obtained from the estimated time delay values of respective paths associated with the ranging code of each entering subscriber.

The weight $C_{il}$ of a step function for the ranging code of each entering subscriber in the superimposed portion 437 is determined according to the following equation:

$$C_{il} = \frac{S_{il}}{\sum_{i=1}^{M} \sum_{l=1}^{L} S_{il} + \sigma_\eta^2}$$

wherein $S_{il}$, which is greater than or equal to zero, represents an estimated energy value (not shown in the figure) of each path and $\sigma_\eta$ represents a variance of Gaussian noise. Specifically, when one of the paths for the ranging code is not used, $S_{il}$ of the non-used path can not be measured, so that it well be set equal to zero.

Figure 5:
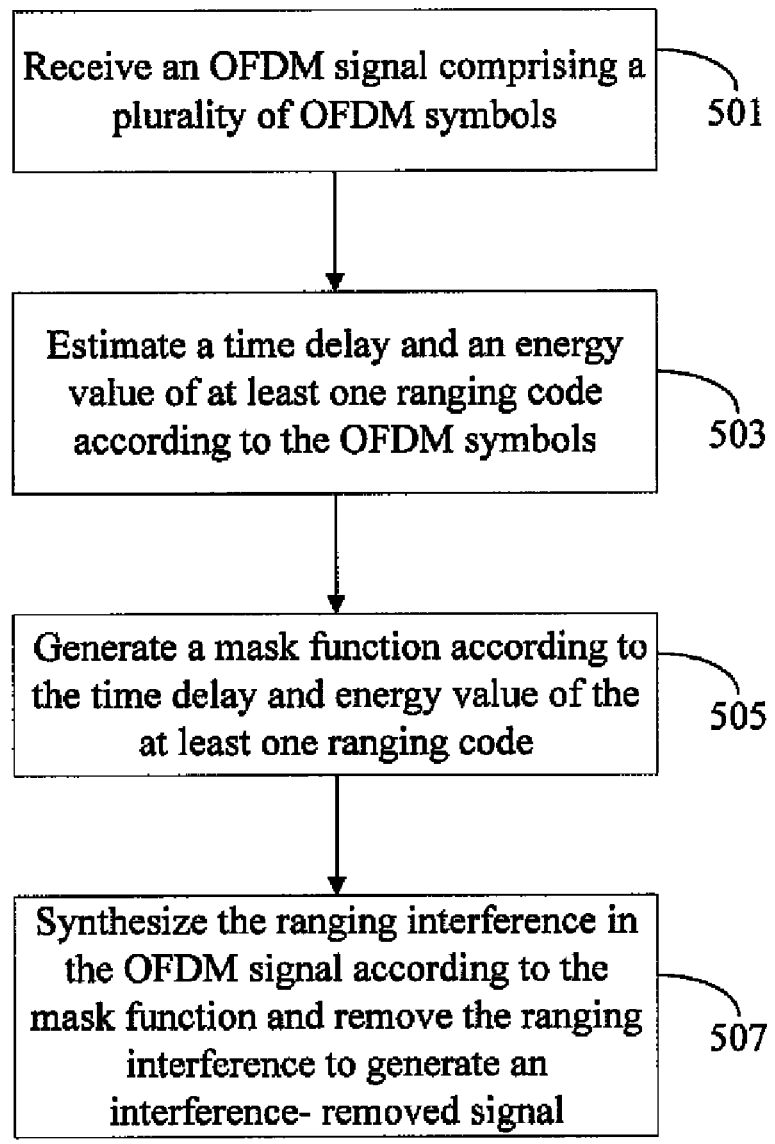
FIG. 5 is a flow diagram illustrating the second embodiment of this invention.

The mask function for removing the superimposed portion 439 is determined according to the following equation:

$$w(n) = \sum_{i=1}^{M} \sum_{l=1}^{L} C_{il} U(t_{il} - n)$$

wherein w(n) represents the mask function, M, which is greater than or equal to one, represents the number of entering subscribers (three in FIG. 4), L, which is greater than or equal to one, represents the number of paths for the ranging code of each entering subscriber, U($ti_{il}$–n) represents the step function for each path of the ranging code of each entering subscriber in the superimposed portion 439, $C_{il}$ represents the weight of each step function (not shown in the figure), which is the same as that of the corresponding step function in the superimposed portion 437 and thus will not be described, n represents the time index, while $t_{il}$ represents the time delay parameter of each path of the ranging code of each entering subscriber in the superimposed portion 439, and is obtained from the estimated time delay values of the respective paths associated with the ranging code of each entering subscriber. The second embodiment of this invention is a method for removing ranging interference in an OFDM signal. This method may be applied to the communication apparatus 2 described in the first embodiment. More specifically, the method for removing the ranging interference in an OFDM signal in the second embodiment is executed by an application controlling various units of the communication apparatus 2. A flow diagram of this method is illustrated in FIG. 5. The application may be stored in a tangible machine-readable medium, which may be a read-only memory (ROM), a flash memory, a floppy disk, a hard disk, a compact disk, a magnetic tape, a database accessible via a network, or any other storage media having the same functionalities readily occur to those skilled in the art.

Steps described hereinbelow are executed to remove the ranging interference in an OFDM signal. Initially in step 501, the application enables a receiving unit to receive the OFDM signal comprising a plurality of OFDM symbols. Next in step 503, the application enables a processing unit to estimate a time delay and an energy value of at least one ranging code according to the OFDM symbols. Then in step 505, the application enables a mask generating unit to generate a mask function according to the time delay and energy value of the at least one ranging code. Finally in step 507, the application enables the processing unit to synthesize the ranging interference in the OFDM signal according to the mask function and remove the ranging interference to generate an interference-removed signal.

In addition to the aforementioned steps, the second embodiment is also capable of executing the operations and functionalities described in the first embodiment. Those of ordinary skill in the art may readily appreciate how the second embodiment executes these operations and functionalities based on the description of the first embodiment, and thus this will not be further described in detail.

It follows from the above description that this invention estimates the time delays and the energy values of ranging codes based on the OFDM signal comprising OFDM symbols received from one or more SSs in an uplink transmission, and then generates a mask function according to the time delays and the energy values of the ranging codes. Finally, possible interference caused by the ranging codes is synthesized according to the mask function and filtered from the OFDM signal to avoid making errors in other data from the SSs due to the ranging interference. As a result, when processing an OFDM signal, a communication apparatus may avoid or remove the ranging interference caused by the initial ranging symbols with less computation and maintain the overall bandwidth efficiency and data transmission rate of the wireless communication system.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:
1. A method for removing ranging interference in an orthogonal frequency division multiplexing (OFDM) signal, the OFDM signal comprising a plurality of OFDM symbols, the method comprising the steps of:
receiving the OFDM signal;
estimating a time delay and an energy value of at least one ranging code according to the OFDM symbols;
generating a mask function according to the time delay and the energy value of the at least one ranging code;
synthesizing the ranging interference in the OFDM signal according to the mask function; and
removing the ranging interference from the OFDM signal;
wherein the at least one ranging code is a plurality of ranging codes, the mask function is determined according to the following equation:

$$w(n) = \sum_{i=1}^{M} \sum_{l=1}^{L} C_{il} U(n - t_{il})$$

wherein w(n) represents the mask function, $U(n-t_{il})$ represents a step function for each of a plurality of paths associated with the ranging codes, $C_{il}$ represents a weight of each of the step functions, n represents a time index, M represents a number of the ranging codes, L represents a number of the paths for each of the ranging codes, and $t_{il}$ represents the time delay parameter of each of the paths associated with the ranging codes.

2. The method as claimed in claim 1, wherein the weight of each of the step functions is determined according to the following equation:

$$C_{il} = \frac{S_{il}}{\sum_{i=1}^{M} \sum_{l=1}^{L} S_{il} + \sigma_\eta^2}$$

wherein $S_{il}$ represents the energy value of each of the paths associated with the ranging codes and $\sigma_\eta$ represents a variance of Gaussian noise.

3. The method as claimed in claim 2, wherein M is greater than or equal to one, L is greater than or equal to one, and $S_{il}$ is greater than or equal to zero.

4. A method for removing ranging interference in an orthogonal frequency division multiplexing (OFDM) signal, the OFDM signal comprising a plurality of OFDM symbols, the method comprising the steps of:
receiving the OFDM signal;
estimating a time delay and an energy value of at least one ranging code according to the OFDM symbols;
generating a mask function according to the time delay and the energy value of the at least one ranging code;
synthesizing the ranging interference in the OFDM signal according to the mask function; and
removing the ranging interference from the OFDM signal;
wherein the at least one ranging code is a plurality of ranging codes, the mask function is determined according to the following equation:

$$w(n) = \sum_{i=1}^{M} \sum_{l=1}^{L} C_{il} U(t_{il} - n)$$

wherein w(n) represents the mask function, $U(t_{il}-n)$ represents a step function for each of a plurality of paths associated with the ranging codes, $C_{il}$ represents a weight of each of the step functions, n represents a time index, M represents a number of the ranging codes, L represents a number of the paths for each of the ranging codes, and $t_{il}$ represents the time delay parameter of each of the paths associated with the ranging codes.

5. The method as claimed in claim 4, wherein the weight of each of the step functions is determined according to the following equation:

$$C_{il} = \frac{S_{il}}{\sum_{i=1}^{M}\sum_{l=1}^{L} S_{il} + \sigma_\eta^2}$$

wherein $S_{il}$ represents the energy value of each of the paths associated with the ranging codes and $\sigma_\eta$ represents a variance of Gaussian noise.

6. The method as claimed in claim 5, wherein M is greater than or equal to one, L is greater than or equal to one, and $S_{il}$ is greater than or equal to zero.

7. A communication apparatus for processing an OFDM signal, the OFDM signal comprising a plurality of OFDM symbols, the communication apparatus comprising:
  a receiving unit being configured to receive the OFDM signal;
  a processing unit being configured to estimate a time delay and an energy value of at least one ranging code according to the OFDM symbols; and
  a mask generating unit being configured to generate a mask function according to the time delay and the energy value of the at least one ranging code;
  wherein the processing unit synthesizes a ranging interference in the OFDM signal according to the mask function and removes the ranging interference from the OFDM signal, and the at least one ranging code is a plurality of ranging codes, the mask function is determined according to the following equation:

$$w(n) = \sum_{i=1}^{M}\sum_{l=1}^{L} C_{il} U(n - t_{il})$$

wherein $w(n)$ represents the mask function, $U(n-t_{il})$ represents a step function for each of a plurality of paths associated the ranging codes, $C_{il}$ represents a weight of each of the step functions, n represents a time index, M represents a number of the ranging codes, L represents a number of the paths for each of the ranging codes, and $t_{il}$ represents the time delay parameter of each of the paths associated with the ranging codes.

8. The communication apparatus as claimed in claim 7, wherein the weight of each of the step functions is determined according to the following equation:

$$C_{il} = \frac{S_{il}}{\sum_{i=1}^{M}\sum_{l=1}^{L} S_{il} + \sigma_\eta^2}$$

wherein $S_{il}$ represents the energy value of each of the paths associated with the ranging codes, and $\sigma_\eta$ represents a variance of Gaussian noise.

9. The communication apparatus as claimed in claim 8, wherein M is greater than or equal to one, L is greater than or equal to one, and $S_{il}$ is greater than or equal to zero.

10. A communication apparatus for processing an OFDM signal, the OFDM signal comprising a plurality of OFDM symbols, the communication apparatus comprising:
  a receiving unit being configured to receive the OFDM signal;
  a processing unit being configured to estimate a time delay and an energy value of at least one ranging code according to the OFDM symbols; and
  a mask generating unit being configured to generate a mask function according to the time delay and the energy value of the at least one ranging code;
  wherein the processing unit synthesizes a ranging interference in the OFDM signal according to the mask function and removes the ranging interference from the OFDM signal, and the at least one ranging code is a plurality of ranging codes, the mask function is determined according to the following equation:

$$w(n) = \sum_{i=1}^{M}\sum_{l=1}^{L} C_{il} U(t_{il} - n)$$

wherein $w(n)$ represents the mask function, $U(t_{il}-n)$ represents a step function for each of a plurality of paths associated with the ranging codes, $C_{il}$ represents a weight of each of the step functions, n represents a time index, M represents a number of the ranging codes, L represents a number of the paths for each of the ranging codes, and $t_{il}$ represents the time delay parameter of each of the paths associated with the ranging codes.

11. The communication apparatus as claimed in claim 10, wherein the weight of each of the step functions is determined according to the following equation:

$$C_{il} = \frac{S_{il}}{\sum_{i=1}^{M}\sum_{l=1}^{L} S_{il} + \sigma_\eta^2}$$

wherein $S_{il}$ represents the energy value of each of the paths associated with the ranging codes and $\sigma_\eta$ represents a variance of Gaussian noise.

12. The communication apparatus as claimed in claim 11, wherein M is greater than or equal to one, L is greater than or equal to one, and $S_{il}$ is greater than or equal to zero.

13. A tangible non-transitory machine-readable medium having executable code to cause a communication apparatus to perform a method for removing ranging interference of an OFDM signal, the OFDM signal comprising a plurality of OFDM symbols, the method comprising the steps of:
  receiving the OFDM signal;
  estimating a time delay and an energy value of at least one ranging code according to the OFDM symbols;
  generating a mask function according to the time delay and the energy value of the at least one ranging code;
  synthesizing the ranging interference in the OFDM signal according to the mask function; and
  removing the ranging interference from the OFDM signal;
  wherein the at least one ranging code is a plurality of ranging codes, the mask function is determined according to the following equation:

$$w(n) = \sum_{i=1}^{M}\sum_{l=1}^{L} C_{il} U(n - t_{il})$$

wherein w(n) represents the mask function, $U(n-t_{il})$ represents a step function for each of a plurality of paths associated with the ranging codes, $C_{il}$ represents a weight of each of the step functions, n represents a time index, M represents a number of the ranging codes, L represents a number of the paths for each of the ranging codes, and $t_{il}$ represents the time delay parameter of each of the paths associated with the ranging codes.

14. The tangible non-transitory machine-readable medium as claimed in claim 13, wherein the weight of each of the step functions is determined according to the following equation:

$$C_{il} = \frac{S_{il}}{\sum_{i=1}^{M}\sum_{l=1}^{L} S_{il} + \sigma_\eta^2}$$

wherein $S_{il}$ represents the energy value of each of the paths associated with the ranging codes and $\sigma_\eta$ represents a variance of Gaussian noise.

15. The tangible non-transitory machine-readable medium as claimed in claim 14, wherein M is greater than or equal to one, L is greater than or equal to one, and $S_{il}$ is greater than or equal to zero.

16. A tangible non-transitory machine-readable medium having executable code to cause a communication apparatus to perform a method for removing ranging interference of an OFDM signal, the OFDM signal comprising a plurality of OFDM symbols, the method comprising the steps of:
receiving the OFDM signal;
estimating a time delay and an energy value of at least one ranging code according to the OFDM symbols;
generating a mask function according to the time delay and the energy value of the at least one ranging code;
synthesizing the ranging interference in the OFDM signal according to the mask function; and
removing the ranging interference from the OFDM signal;
wherein the at least one ranging code is a plurality of ranging codes, the mask function is determined according to the following equation:

$$w(n) = \sum_{i=1}^{M}\sum_{l=1}^{L} C_{il} U(t_{il} - n)$$

wherein w(n) represents the mask function, $U(t_{il}-n)$ represents a step function for each of a plurality of paths associated with the ranging codes, $C_{il}$ represents a weight of each of the step functions, n represents a time index, M represents a number of the ranging codes, L represents a number of the paths for each of the ranging codes, and $t_{il}$ represents the time delay parameter of each of the paths associated with the ranging codes.

17. The tangible non-transitory machine-readable medium as claimed in claim 16, wherein the weight of each of the step functions is determined according to the following equation:

$$C_{il} = \frac{S_{il}}{\sum_{i=1}^{M}\sum_{l=1}^{L} S_{il} + \sigma_\eta^2}$$

wherein $S_{il}$ represents the energy value of each of the paths associated with the ranging codes and $\sigma_\eta$ represents a variance of Gaussian noise.

18. The tangible non-transitory machine-readable medium as claimed in claim 17, wherein M is greater than or equal to one, L is greater than or equal to one, and $S_{il}$ is greater than or equal to zero.

* * * * *